United States Patent [19]

Maginot et al.

[11] Patent Number: 5,785,941
[45] Date of Patent: Jul. 28, 1998

[54] PROCESS FOR PREPARING FINELY DIVIDED SILICA AND APPARATUS FOR CARRYING OUT THE PROCESS

[76] Inventors: Helmut Maginot, Wendelsteinstrasse 24, D-84508 Burgkirchen; Johann Huber, Karl-Gross-Strasse 6, D-84489 Burghausen, both of Germany

[21] Appl. No.: 558,975

[22] Filed: Nov. 13, 1995

Related U.S. Application Data

[63] Continuation of Ser. No. 271,355, Jul. 6, 1994, abandoned.

[30] Foreign Application Priority Data

Jul. 8, 1993 [DE] Germany .................. 43 22 804.6

[51] Int. Cl.⁶ .................................................. C01B 33/12
[52] U.S. Cl. .................. 423/337; 423/325; 431/121; 431/122; 431/123; 239/DIG. 21
[58] Field of Search .................... 423/337, 325; 122/390, 405, DIG. 7; 431/121, 122, 123; 239/DIG. 21

[56] References Cited

U.S. PATENT DOCUMENTS

| | | | |
|---|---|---|---|
| 2,990,249 | 6/1961 | Wagner et al. | 23/142 |
| 3,391,997 | 7/1968 | Holland et al. | 423/337 |
| 3,560,152 | 2/1971 | Dunham et al. | 423/624 |
| 3,663,283 | 5/1972 | Herbert et al. | 423/337 |
| 3,942,684 | 3/1976 | Stetson | 222/3 |
| 3,954,945 | 5/1976 | Lange et al. | 423/337 |
| 4,043,741 | 8/1977 | Moss et al. | 431/3 |
| 4,292,290 | 9/1981 | Tunison, III | 423/336 |
| 4,431,135 | 2/1984 | Kaye | 239/8 |
| 4,503,811 | 3/1985 | Hammond | 122/392 |
| 4,603,661 | 8/1986 | Nelson et al. | 122/392 |
| 4,604,050 | 8/1986 | Henrikkson | 431/121 |
| 4,690,159 | 9/1987 | Vadakin et al. | 134/167 C |
| 4,735,175 | 4/1988 | Kaunisvesi | 122/390 |
| 4,757,785 | 7/1988 | Klahn et al. | 122/382 |
| 4,913,646 | 4/1990 | Backheim | 431/116 |
| 5,152,819 | 10/1992 | Blackwell et al. | 423/337 |
| 5,314,726 | 5/1994 | Kurihara et al. | 423/446 |
| 5,355,844 | 10/1994 | Kendrick | 122/390 |

FOREIGN PATENT DOCUMENTS

| | | |
|---|---|---|
| 900339 | 11/1953 | Germany . |
| 900339 | 12/1953 | Germany . |
| 1567404 | 4/1970 | Germany . |
| 2048220 | 4/1971 | Germany . |
| 2153671 | 5/1973 | Germany . |
| 2909815 | 11/1984 | Germany . |
| 2702896 | 4/1987 | Germany . |
| 3338888 | 11/1987 | Germany . |
| 3115002 | 4/1991 | Germany . |
| 9201690 | 7/1992 | Germany . |
| 1412472 | 11/1975 | United Kingdom . |
| 1563272 | 3/1980 | United Kingdom . |
| 2049641 | 12/1980 | United Kingdom . |

OTHER PUBLICATIONS

Derwent Abstract 84-115488 (19) for DE-PS 33 38 888 (no date).

*Primary Examiner*—Deborah Jones
*Assistant Examiner*—Amy M. Harding

[57] ABSTRACT

A process for preparing finely divided silica by reaction of gaseous or vaporizable silicon compounds in a mixture with gases forming water on combustion with air or oxygen in a flame includes producing discharges of gas in the combustion chamber by means of at least one gas gun. The apparatus for carrying out this process has applied to the outside of the combustion chamber wall at least one gas gun which produces a discharge of gas via an opening in the combustion chamber wall, preferably in conjunction with a nozzle on the inside of the combustion chamber wall.

8 Claims, 1 Drawing Sheet

5,785,941

PROCESS FOR PREPARING FINELY DIVIDED SILICA AND APPARATUS FOR CARRYING OUT THE PROCESS

This is a continuation of copending application Ser. No. 08/271,355 filed on Jul. 6, 1994 now abandoned.

BACKGROUND OF THE INVENTION

1. Field of the Invention

The present invention relates to a process for preparing finely divided silica, and to an apparatus for carrying out the process.

2. The Prior Art

It is known that finely particulate silicon dioxide (finely divided silica) can be prepared by reaction of gaseous or vaporizable silicon compounds in a mixture with gases forming water on combustion with air or oxygen in a flame.

These processes have the problem of the formation of a coating on the wall of the combustion chamber. The coatings arise from the deposition of the silicon dioxide particles formed in the flame on the combustion chamber wall and, by thermal insulation, cause an effect on the heat balance in the combustion chamber which leads to the alteration of important product properties such as, for example, the specific surface area. Furthermore, coatings which become detached cause impurities in the product, which make the material unsuitable for many areas of application.

In the prior art, several apparatus have been proposed for avoiding the formation of a wall coating in the preparation of finely divided silica. DE-C 900,339 describes ventilated sintered ceramic walls of the combustion chamber which, however, only lead to improved results with considerable technical effort and expense. DE-C 3,115,002 and the corresponding U.S. Pat. No. 4,292,290 describe the sheathing of the flame with a cooling stream of air which, however, leads to an undesired effect by causing a thickening of the finely divided silica obtained.

SUMMARY OF THE INVENTION

It is an object of the present invention to provide a process and an apparatus which avoids the disadvantages of the formation of a coating on the combustion chamber wall and avoids other disadvantages of the prior art, and also give products having improved properties.

This object is achieved by a process for preparing finely divided silica by reaction of gaseous or vaporizable silicon compounds in a mixture with gases forming water on combustion with air or oxygen in a flame, which comprises producing discharges of gas in the combustion chamber by means of at least one gas gun.

The apparatus of the invention for carrying out this process has adjacent to the outside of the combustion chamber wall at least one gas gun which produces a discharge of gas via an opening in the combustion chamber wall, preferably in conjunction with a nozzle on the inside of the combustion chamber wall.

The process of the invention and the apparatus of the invention also produce, besides improved product properties, larger throughput amounts, since the burner can be operated at higher particle concentrations.

The process of the invention and the apparatus of the invention can be universally used in all processes for preparing finely divided silica by reaction of gaseous or vaporizable silicon compounds in a mixture with gases forming water on combustion with air or oxygen in a flame.

For this reason, reference is made, with regard to the starting materials such as, for example, gaseous or vaporizable silicon compounds and gases forming water on combustion, the configuration of the burner and the combustion chambers and also the process parameters used, to, for example, the following publications: DE-C 900,339; DE-C 3,115,002 and corresponding U.S. Pat. No. 4,292,290; DE-A 2,909,815 and corresponding GB 2,049,641; DE-A 2,153,671 and corresponding GB 1,412,472; DE-A 2,702,896 and corresponding GB 1,563,272; DE-A 2,048,220 and corresponding U.S. Pat. No. 3,663,283; and DE-A 3,338,888.

The above mentioned publications represent an example of a selection and therefore in no way limit the applicability of the process of the invention and the apparatus of the invention.

In this process, gaseous or vaporizable silanes, for example chlorosilanes such as $SiCl_4$, $SiHCl_3$, $SiH_2Cl_2$, or organochlorosilanes such as $CH_3SiCl_3$, $CH_3SiHCl_2$, $(CH_3)_2SiCl_2$, in a mixture with gases forming water on combustion such as, for example, hydrogen, methane or propane, and air or oxygen are usually reacted in the flame.

This combustion is preferably carried out in a cylindrical combustion chamber, or one which widens conically in the flow direction, and preferably made of aluminum or high-alloy stainless steels. To protect the combustion chamber from overheating, it is advantageously cooled with water in a surrounding water coil jacket, for example.

The gas mixture is fed in at the top of the preferably vertically arranged combustion chamber by means of one or more burner nozzles. The process gas including the solid formed in the flame is extracted at the other end of the combustion chamber and the target product is separated off.

The gas guns used according to the invention are commercially available, for example, from VSR Engineering GmbH Fördertechnik, D-4330 Muhlheim a.d. Ruhr, Hinterbergstrasse 319, under the model designation BIG BLASTER® gas guns, and comprise a gas reservoir which, by means of a specially designed opening mechanism, makes possible the explosive decompression of the gas contained therein.

By variation of these gas guns with respect to the reservoir volume, the reservoir pressure, the number per combustion chamber, the arrangement on the combustion chamber, the gas contained and the control mechanism, it is possible to optimally match the cleaning of these guns to the respective operational requirements.

The number of gas guns applied to the outer wall of the combustion chamber is dependent on the size and geometry of the combustion chamber used. For combustion chambers usually used in the process of the invention or in the apparatus of the invention, the use of 3 or 4 gas guns at a reservoir pressure of preferably from 4 to 8 bar, a reservoir volume of preferably from 20 to 150 liters and a frequency of intermittent discharges of gas of preferably 3 or 4 discharges per hour per gas gun has proven suitable. The gases used are preferably compressed air or nitrogen.

BRIEF DESCRIPTION OF THE DRAWINGS

Other objects and features of the present invention will become apparent from the following detailed description considered in connection with the accompanying drawings which disclose the embodiments of the present invention. It should be understood, however, that the drawings are designed for the purpose of illustration only and not as a definition of the limits of the invention.

In the drawings, wherein similar reference characters denote similar elements throughout the several views.

DETAILED DESCRIPTION OF PREFERRED EMBODIMENTS

Figure 1:
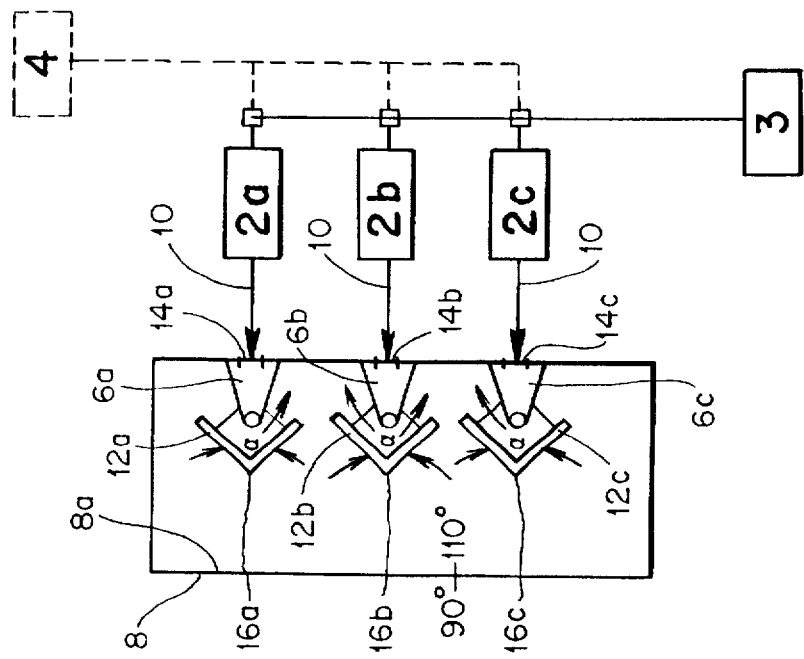
FIG. 1 is a longitudinal section view of the apparatus of the invention.

Turning now in detail to the drawing, FIG. 1 shows a longitudinal section view of the combustion chamber 1, gas guns 2a, 2b and 2c, gas feed 3 and control unit 4.

Figure 2:
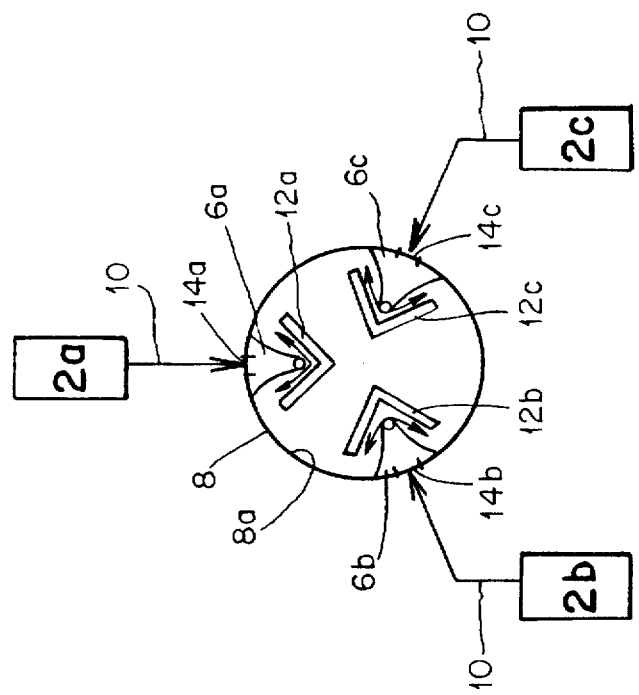
FIG. 2 is a cross-sectional view of the apparatus of the invention.

FIG. 2 shows a view, in cross section, of combustion chamber 1 and three gas guns 2a, 2b and 2c which are preferably equidistantly apart or spaced 120° apart around the circumference chamber 1.

The nozzles 6a, 6b and 6c preferably used serve to uniformly distribute the gas discharging explosively from the gas gun over the inside wall 8a of the combustion chamber wall 8. Nozzles which have proven particularly suitable are those in which the gas 10 coming out of the gas gun is changed or reversed by nozzle reversal means 12a, 12b, 12c, preferably 90°–110°, most preferably 90°–95°, in the direction of the inside wall 8a of the combustion chamber and is uniformly distributed over the inside wall 8a of the combustion chamber via preferably 1–4, in particular 3–4, openings 14a, 14b, 14c.

As seen in FIGS. 1 and 2, the nozzle reversal means 12a, 12b and 12c are preferably conical in shape and have an angle $\alpha$ at the tip 16a, 16b, 16c of the cone of preferably 90°–110°, and most preferably 90°–95°.

To avoid burning away of the nozzle at the temperatures prevailing inside of the combustion chamber, cooling of the nozzle is preferably provided, in particular in the region of the tip 16a, 16b, 16c. Deionized water is preferably used as cooling medium.

EXAMPLE

The reactants hydrogen, natural gas, air and methyltrichlorosilane were fed as a mixture into a concentrically arranged nozzle which projected into the vertically arranged combustion chamber.

A flame was formed in which the reaction proceeded. The flame temperature was approximately 1000° C.

The reaction produced the target product $SiO_2$.

The combustion chamber was fitted with 4 gas guns which suppressed the deposition of $SiO_2$ particles on the wall of the combustion chamber.

The reaction products $SiO_2$, HCl and steam were drawn off together with the proportion of inert gas and excess of oxygen in the lower burner region and fed to heat recovery means (not shown) and solids separation means (not shown).

The specific surface area was given in $m^2/g$ ($N_2$ adsorption measurement method in accordance with DIN 66 131/66 132). The grit measurement was carried out in accordance with DIN-ISO 787/18.

The $SiO_2$ obtained had the following properties: specific surface area [$m^2/g$]: 130, and grit [% by weight]: 0.002±0.001.

COMPARATIVE EXAMPLE

The example was repeated, but without the gas guns and discharges of gas according to the invention.

The $SiO_2$ obtained had the following properties: specific surface area [$m^2/g$]: 130, and grit [% by weight]: 0.008±0.001.

While only one embodiment of the present invention has been shown and described, it is to be understood that many changes and modifications may be made thereunto without departing from the spirit and scope of the invention as defined in the appended claims.

What is claimed is:

1. A process which avoids the formation of a coating on a wall of the combustion chamber arising from a deposition of silicon dioxide particles formed during a process for preparing silica in the combustion chamber comprising intermittently blowing gas from at least one gas gun in said combustion chamber while said silica is being prepared.

2. The process as claimed in claim 1, comprising using 3 or 4 gas guns.

3. The process as claimed in claim 1, comprising maintaining pressure within a gas reservoir of the gas gun at from 4 to 8 bar.

4. The process as claimed in claim 1, comprising changing the direction of the gas coming out of the gas gun by an angle from 90 to 110 degrees.

5. The process as claimed in claim 4, comprising changing the direction of the gas coming out of the gas gun by an angle from 90 to 95 degrees.

6. The process as claimed in claim 1, comprising producing 3 or 4 discharges of gas per hour per gas gun.

7. The process as claimed in claim 1, comprising using compressed air as said gas.

8. A process which avoids the formation of coating on a wall of a combustion chamber arising from a deposition of silicon dioxide particles formed during a process for preparing silica in the combustion chamber comprising intermittently explosively decompressing gas from at least one gas gun in said combustion chamber while said silica is being prepared.

* * * * *

UNITED STATES PATENT AND TRADEMARK OFFICE
CERTIFICATE OF CORRECTION

PATENT NO. : 5,785,941
DATED : July 28, 1998
INVENTOR(S) : Helmut Maginot, et al.

It is certified that error appears in the above-indentified patent and that said Letters Patent is hereby corrected as shown below:

On the cover page, column, 1, line 3, change "[76]" to
-- [75] --.
After the listing of the inventors, insert --
[73] Assignee: Wacker-Chemie GmbH, Munich, Germany --

Signed and Sealed this

Twenty-third Day of February, 1999

Attest:

Q. TODD DICKINSON

*Attesting Officer*     *Acting Commissioner of Patents and Trademarks*